US007426218B1

(12) United States Patent
Archer et al.

(10) Patent No.: US 7,426,218 B1
(45) Date of Patent: Sep. 16, 2008

(54) COMMUNICATION SYSTEMS AND QSIG COMMUNICATIONS METHODS

(75) Inventors: Jarrett E. Archer, Celeste, TX (US); Joseph A. Scivicque, Wylie, TX (US); Frederick A. Sherman, Mesquite, TX (US); Heath W. Hendrickson, Murphy, TX (US)

(73) Assignee: Verizon Business Global LLC, Basking Ridge, NJ (US)

( * ) Notice: Subject to any disclaimer, the term of this patent is extended or adjusted under 35 U.S.C. 154(b) by 1120 days.

(21) Appl. No.: 09/995,149

(22) Filed: Nov. 27, 2001

(51) Int. Cl.
*H04J 3/16* (2006.01)
*H04J 3/22* (2006.01)

(52) U.S. Cl. .................. 370/466; 370/524; 370/352; 370/401

(58) Field of Classification Search .......... 370/352, 370/401, 466, 388, 389, 395.2, 493, 353, 370/524; 379/221.15
See application file for complete search history.

(56) References Cited

U.S. PATENT DOCUMENTS

| 5,442,662 | A | * | 8/1995 | Fukasawa et al. | 370/342 |
|---|---|---|---|---|---|
| 5,594,732 | A | * | 1/1997 | Bell et al. | 370/401 |
| 5,659,542 | A | | 8/1997 | Bell et al. | |
| 5,953,350 | A | | 9/1999 | Higgins | |
| 6,044,081 | A | * | 3/2000 | Bell et al. | 370/401 |
| 6,304,576 | B1 | | 10/2001 | Corley et al. | |
| 6,711,252 | B2 | * | 3/2004 | Sahala | 379/221.15 |
| 6,795,430 | B1 | * | 9/2004 | Ong et al. | 370/352 |
| 6,801,523 | B1 | * | 10/2004 | Osman | 370/352 |
| 6,816,587 | B1 | * | 11/2004 | Orui et al. | 379/225 |
| 6,950,426 | B2 | * | 9/2005 | Abel et al. | 370/352 |
| 7,031,298 | B2 | * | 4/2006 | Bennai et al. | 370/352 |
| 7,058,067 | B1 | * | 6/2006 | Corley et al. | 370/408 |

| 2002/0031112 | A1 | * | 3/2002 | Bennai et al. | 370/352 |
|---|---|---|---|---|---|
| 2003/0016681 | A1 | * | 1/2003 | Lampola | 370/401 |
| 2003/0091032 | A1 | * | 5/2003 | Laxman et al. | 370/352 |

OTHER PUBLICATIONS

"ECMA Standardizing Information and Communication Systems"; "Private Integrated Services Network (PISN)-Circuit Mode Bearer Services-Inter-Exchange Signaling Procedures and Protocol"; Standard ECMA-143; 3rd Edition; Jun. 1997; pp. 1-155.
"QSIG Handbook"; http://www.qsig.ie/qsig/index.html; Aug. 7, 2001; 1pp.
"QSIG Handbook"; Chapter 1, "Introduction"; http://www.qsig.ie/qsig/1.html; Nov. 7, 2000; pp. 1-3.
"QSIG Handbook"; Chapter 2, "User Benefits"; http://www.qsig.ie/qsig/2.html; Nov. 7, 2000; pp. 1-5.
"QSIG Handbook"; Chapter 3, "QSIG Services and Additional Network Features"; http://www.qsig.ie/qsig/3.html; Nov. 7, 2000; pp. 1-5.
"QSIG Handbook"; Chapter 4, "How is QSIG Standardized"; http://www.qsig.ie/qsig/4.html; Nov. 7, 2000; pp. 1-4.
"QSIG Handbook"; Chapter 5, "Inside QSIG"; http://www.qsig.ie/qsig/5.html; Nov. 7, 2000; pp. 1-5.

* cited by examiner

*Primary Examiner*—Edan Orgad
*Assistant Examiner*—Chuong Ho

(57) ABSTRACT

This invention relates to communication systems and QSIG communication methods. According to a first aspect, a communication system includes a control component; and a data network configured to communicate packets of information intermediate an originating location and a terminating location, the originating location being configured to receive a QSIG communication including a content portion and a signaling portion, wherein the data network is configured to communicate the signaling portion to the control component and the control component is configured to establish a connection within the data network intermediate the originating location and the terminating location responsive to the signaling portion, and wherein the data network is further configured to communicate the content portion of the communication within a plurality of packets intermediate the originating location and the terminating location using the connection.

9 Claims, 7 Drawing Sheets

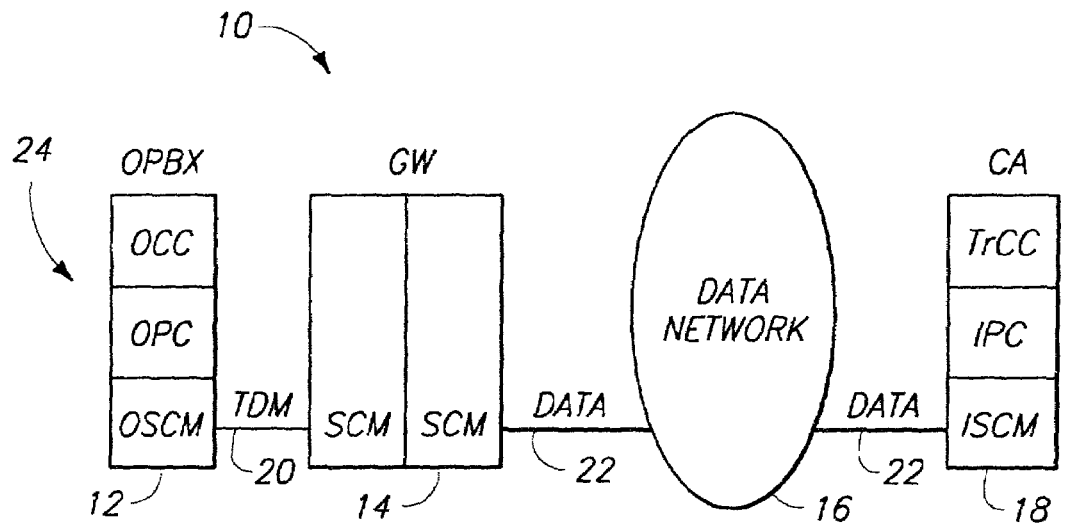
_Fig. 4_
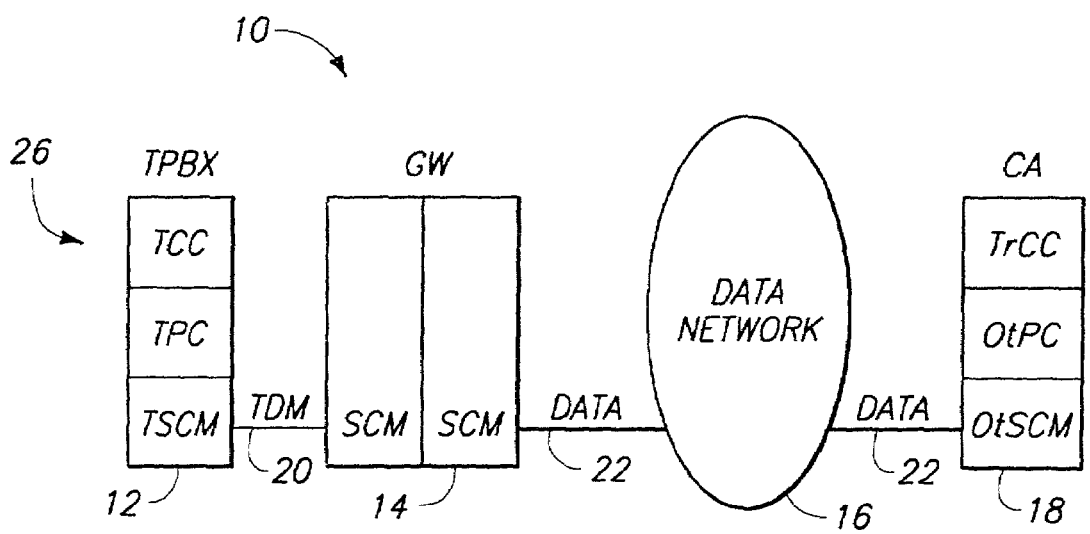
_Fig. 5_

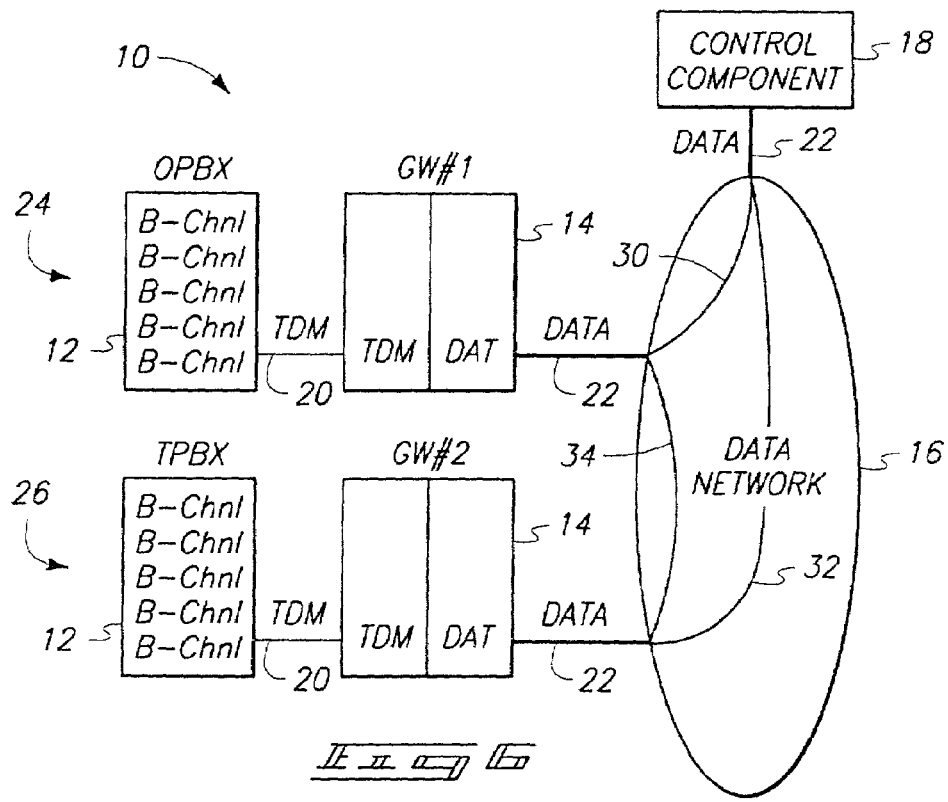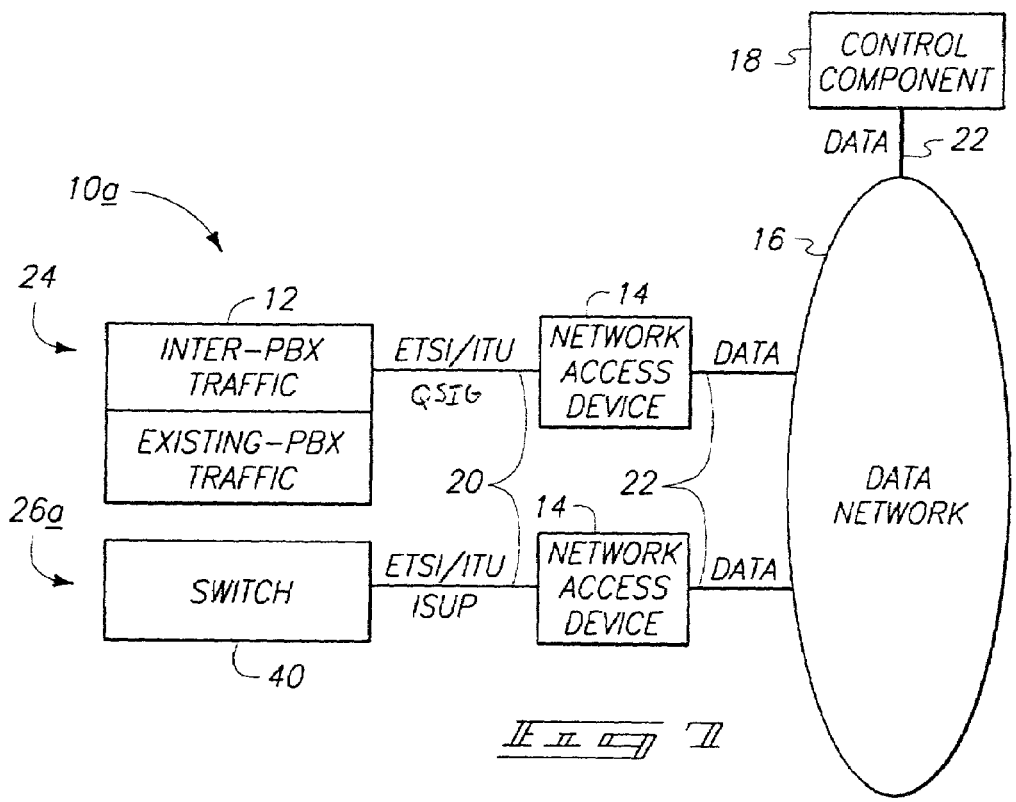

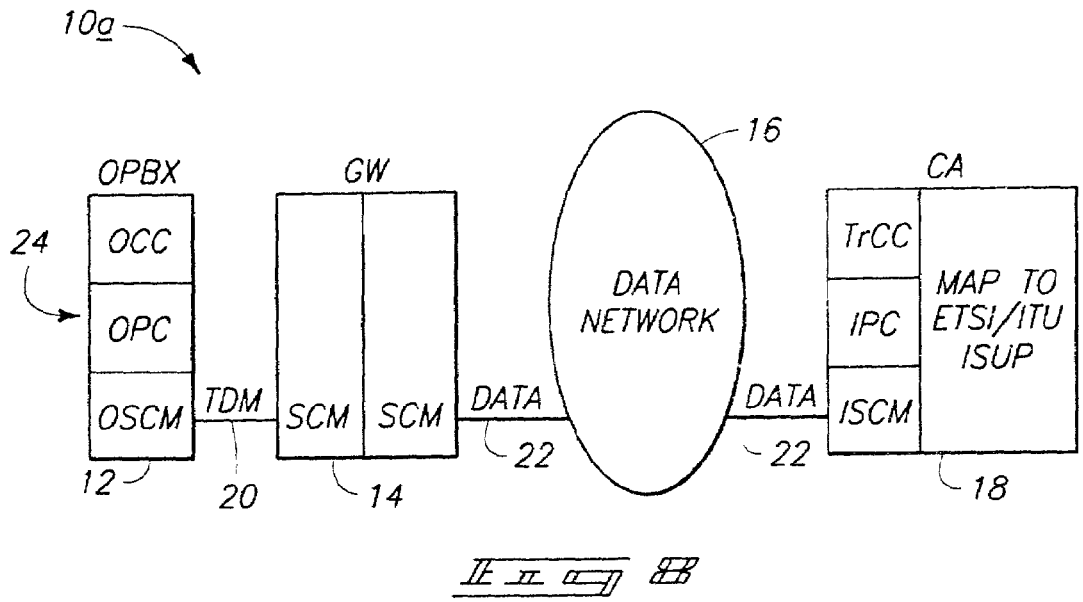
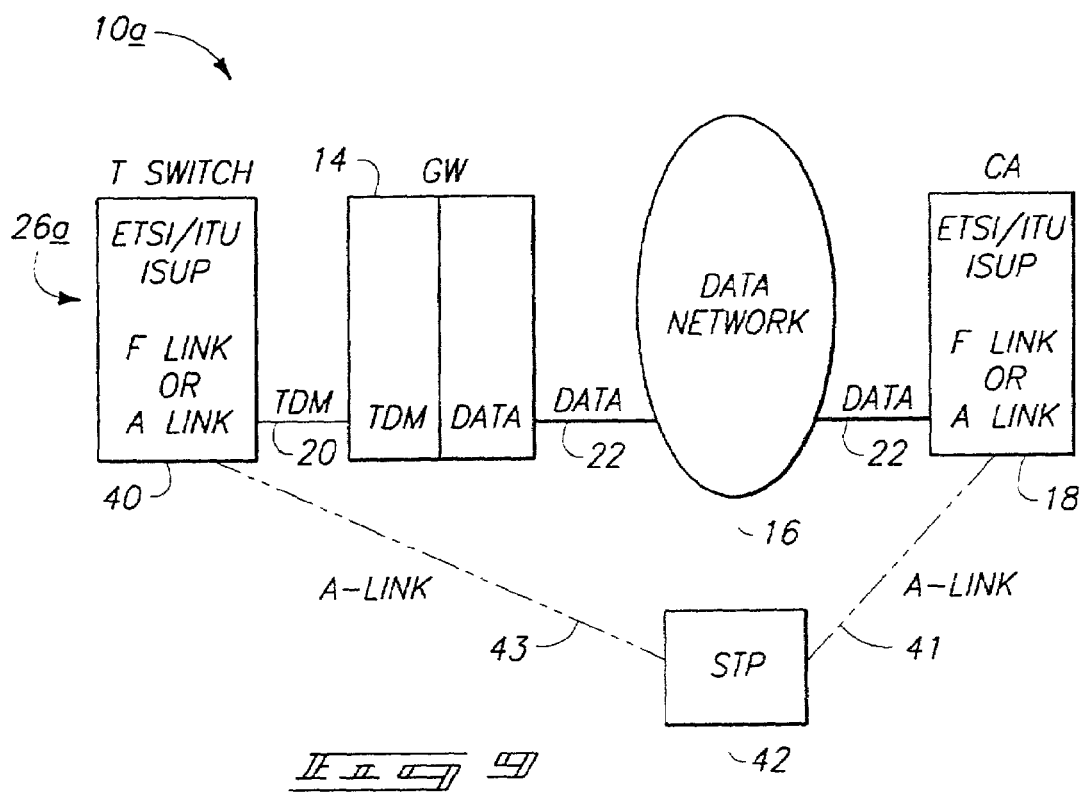

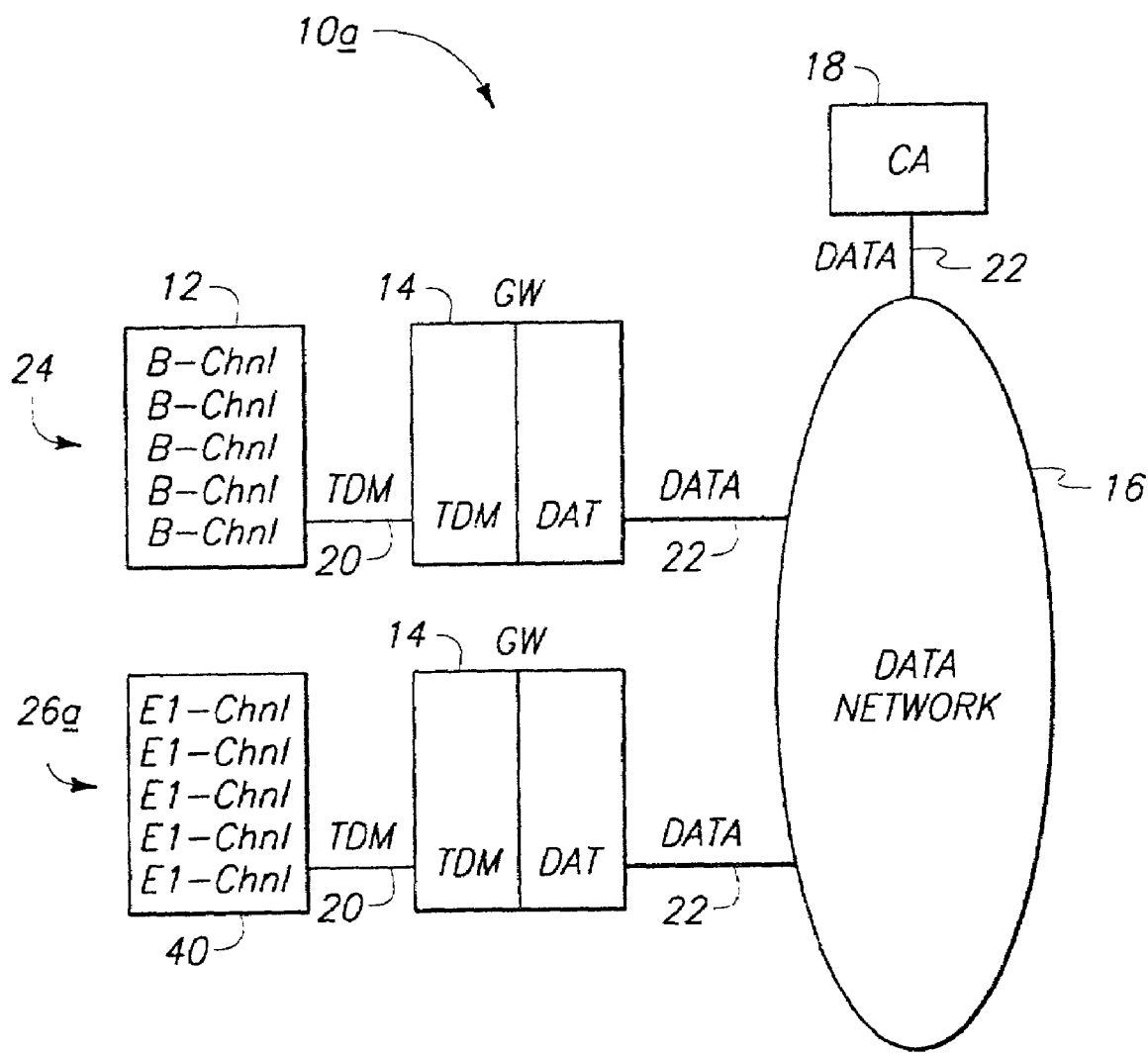

COMMUNICATION SYSTEMS AND QSIG COMMUNICATIONS METHODS

TECHNICAL FIELD

This invention relates to communication systems and QSIG communication methods.

BACKGROUND OF THE INVENTION

QSIG is a global signaling control standard for PINX-to-PINX (private integrated exchange) applications, intended for use in private networks to link multiple vendor PBXs by retaining feature transparency. QSIG provides services including completion of calls to busy subscribers, completion of calls on no reply, call forwarding/diversion, call interception, call intrusion, call offer, call transfer, call waiting, direct dialing in, do not disturb, six identification services, mobile services, multiple subscriber number, operator services, path replacement, recall and sub-addressing.

The European Commission charged the European Telecommunications Standards Institute for development and promotion of the QSIG access protocol. To date, QSIG capability has been a European Commission initiative and as such has a limited deployment domain (EC countries). For example, North American countries which utilize the ANSI standard or Pacific Rim counties which utilize NTT or DDI standards have been incompatible with QSIG. Deployment of the QSIG capability is dependent upon carrier and PBX vendor compliance with ETSI/ITU standards. Accordingly, the QSIG capabilities have been typically limited to countries wherein such standards are used.

Implementation of QSIG access protocols within existing network elements that are presently using non-ETSI/ITU standards encounters constraints including high cost to develop capability within non-ETSI/ITU switch elements, long time deployment cycle required (i.e., time to market delay), network integration costs are high both in time and money, administrative costs for maintaining multiple standards within a single network element are increased, minimal industry support for capability from non-ETSI/ITU countries, unable to achieve economies of scale (i.e., due to custom development), and risk if the product is not successful.

Referring to FIG. 1, a block diagram of a controlled protocol model for QSIG capability is depicted. The model is divided into three planes including call control, protocol control and signaling carriage mechanism. The call control entity communicates with peer call control entities to establish inter-PBX bearer channel connections between the two entities. The protocol entity provides services to the call control entity to facilitate the ability of the call control to send information flows to and receive information flows from peer call control entities. The signaling carriage mechanism provides services to the protocol entity for the transfer of messages. The signaling and bearer channels utilized to support QSIG capability are conveyed between appropriate network elements.

Referring to FIG. 2, a conventional network topology requires that a carrier use ETSI/ITU conforming network elements wherein external PBX communications access (i.e., voice and data) are controlled and managed by the ETSI/ITU conforming carrier. In addition, PSTN access is controlled and managed by the ETSI/ITU conforming carrier. PBX network elements have the appearance of being part of a single virtual PBX resulting from the feature transparency. When both the network and the PBX equipment conform to ETSI/ITU standards the virtual PBX model occurs because the vendors have signed a QSIG memorandum of understanding (MoU) and are committed to support the development, testing and inter-operability of the QSIG access protocols. Further, the network carrier supports the QSIG protocol standards that are required to allow the MoU client vendors to inter-operate.

There exists a need to provide improved devices and methods which utilize QSIG in other networks.

SUMMARY OF THE INVENTION

The present invention provides communication systems and QSIG communication methods.

According to a first aspect, a communication system comprises a control component; and a data network configured to communicate packets of information intermediate an originating location and a terminating location, the originating location being configured to receive a QSIG communication including a content portion and a signaling portion, wherein the data network is configured to communicate the signaling portion to the control component and the control component is configured to establish a connection within the data network intermediate the originating location and the terminating location responsive to the signaling portion, and wherein the data network is further configured to communicate the content portion of the communication within a plurality of packets intermediate the originating location and the terminating location using the connection.

According to another aspect, a communication system comprises an originating network access device configured to receive a continuous QSIG communication and including a continuous content portion and a continuous signaling portion and to convert the continuous content portion and the continuous signaling portion into a plurality of respective content packets and signaling packets; a terminating network access device; a control component; and a data network coupled with the control component and having an originating location coupled with the originating network device and a terminating location coupled with the terminating network access device and the data network being configured to communicate the content packets and signaling packets, wherein the originating network device is configured to tunnel the signaling packets to the control component and the control component is configured to establish a connection within the data network intermediate the originating location and the terminating location responsive to the signaling packets, and the data network is configured to communicate the content packets of the communication intermediate the originating location and the terminating location using the connection.

Another aspect of the invention provides a QSIG communications method comprising: receiving a QSIG communication comprising a content portion and a signaling portion within a data network configured to communicate data within a plurality of packets intermediate an originating location and a terminating location; forwarding the signaling portion of the communication to a control component using the data network; establishing a connection within the data network intermediate the originating location of the data network and the terminating location of the data network using the control component and responsive to the forwarding; and communicating the content portion of the communication within a plurality of packets intermediate the originating location and the terminating location using the connection within the data network.

Another aspect provides a QSIG communications method comprising: providing a data network coupled with an originating network access device, a terminating network access device and a control component, the data network being configured to communicate a plurality of packets; formulating a communication comprising a content portion and a signaling portion in accordance with the QSIG access protocol; encapsulating the content portion and the signaling portion of the communication using the originating network access device providing a plurality of respective content packets and signaling packets; tunneling the signaling packets from the first network access device to the control component using the data network; establishing a connection within the data network intermediate the originating network access device and the terminating network access device using the control component after the tunneling; and communicating the content packets from the originating network access device to the terminating network access device using the data network after the establishing.

Other aspects are provided, some of which are described below.

BRIEF DESCRIPTION OF THE DRAWINGS

Preferred embodiments of the invention are described below with reference to the following accompanying drawings.

FIG. 4 is an illustrative representation of an exemplary signaling method originating of the network topology of FIG. 3.

FIG. 5 is an illustrative representation of an exemplary signaling method terminating of the network topology of FIG. 3.

FIG. 6 is an illustrative representation depicting organization of bearer channel to bearer channel communications of the network topology of FIG. 3.

FIG. 7 is an illustrative representation depicting an exemplary inter-working network topology according to aspects of the present invention.

FIG. 8 is an illustrative representation of an exemplary inter-working signaling method originating of the network topology of FIG. 7.

FIG. 9 is an illustrative representation of an exemplary inter-working signaling method terminating of the network topology of FIG. 7.

FIG. 10 is an illustrative representation of an inter-working signaling arrangement of the network topology of FIG. 7.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

According to aspects of the present invention, systems and methods for tunneling QSIG signaling information through a data network, a method of partitioning inter-PBX channels and a method of integrating non-ETSI/ITU origination/terminations with ETSI/ITU originations/terminations are disclosed. In addition, capabilities are provided for QSIG communications including North American (ANSI) deployment, Pacific Rim (NTT or DDI) deployment, interworking with EC and UK deployments, limited PBX change requirements, limited class 3 or 5 switch change requirements and next generation service capabilities. Aspects of the present invention provide systems and methods wherein QSIG deployment is accomplished regardless of the standards used within the country where the capability is deployed.

Referring to FIGS. 3-6, aspects of the invention are described with respect to implementation of QSIG capabilities between devices within non-ETSI/ITU countries.

Figure 1:
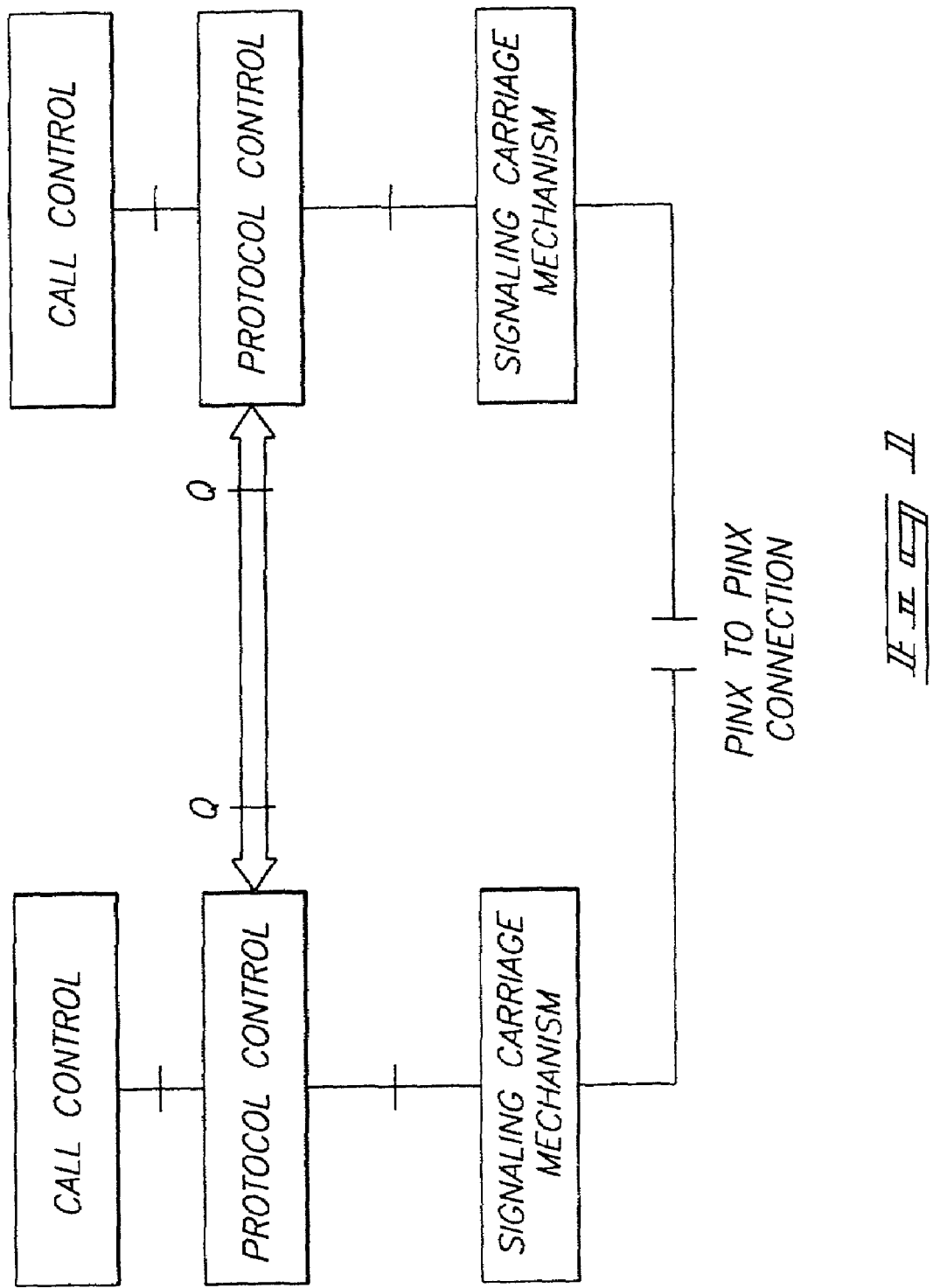
FIG. 1 depicts an exemplary QSIG control protocol model.
Figure 2:
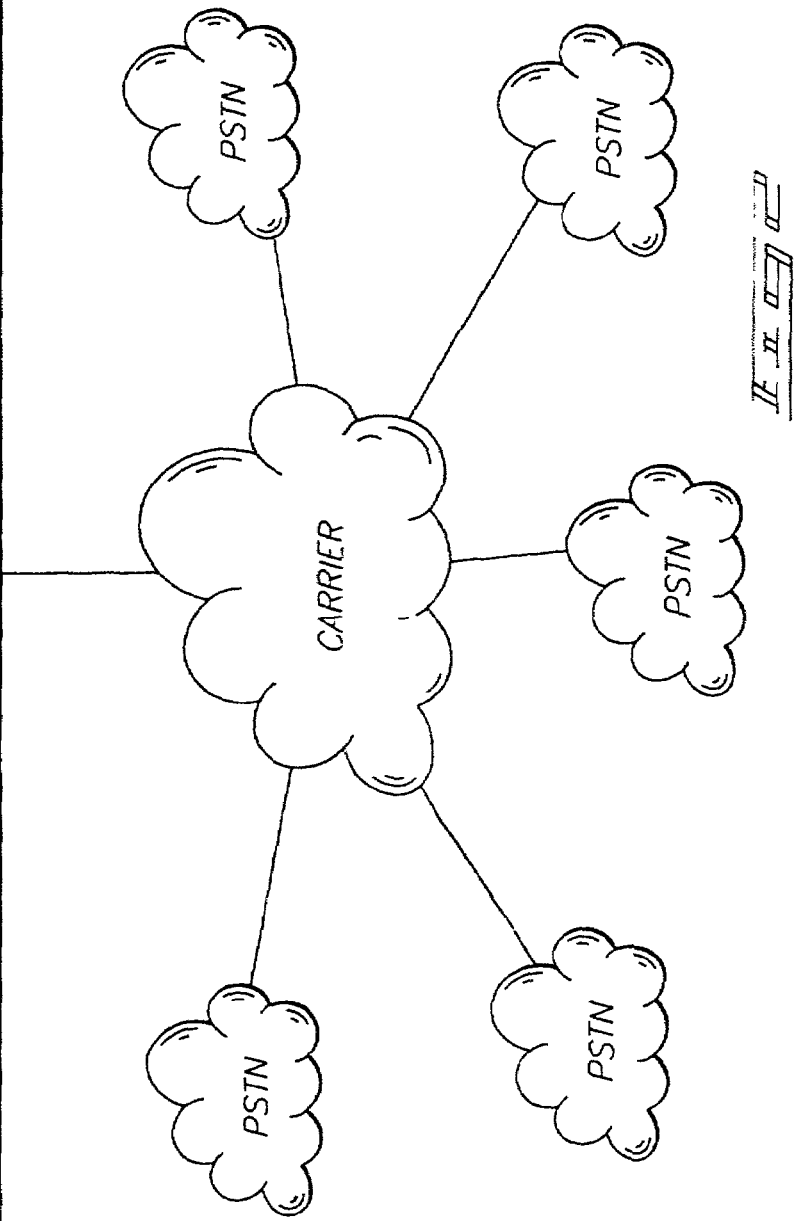
FIG. 2 depicts an illustrative representation of CTN topology with feature transparency.
Figure 3:
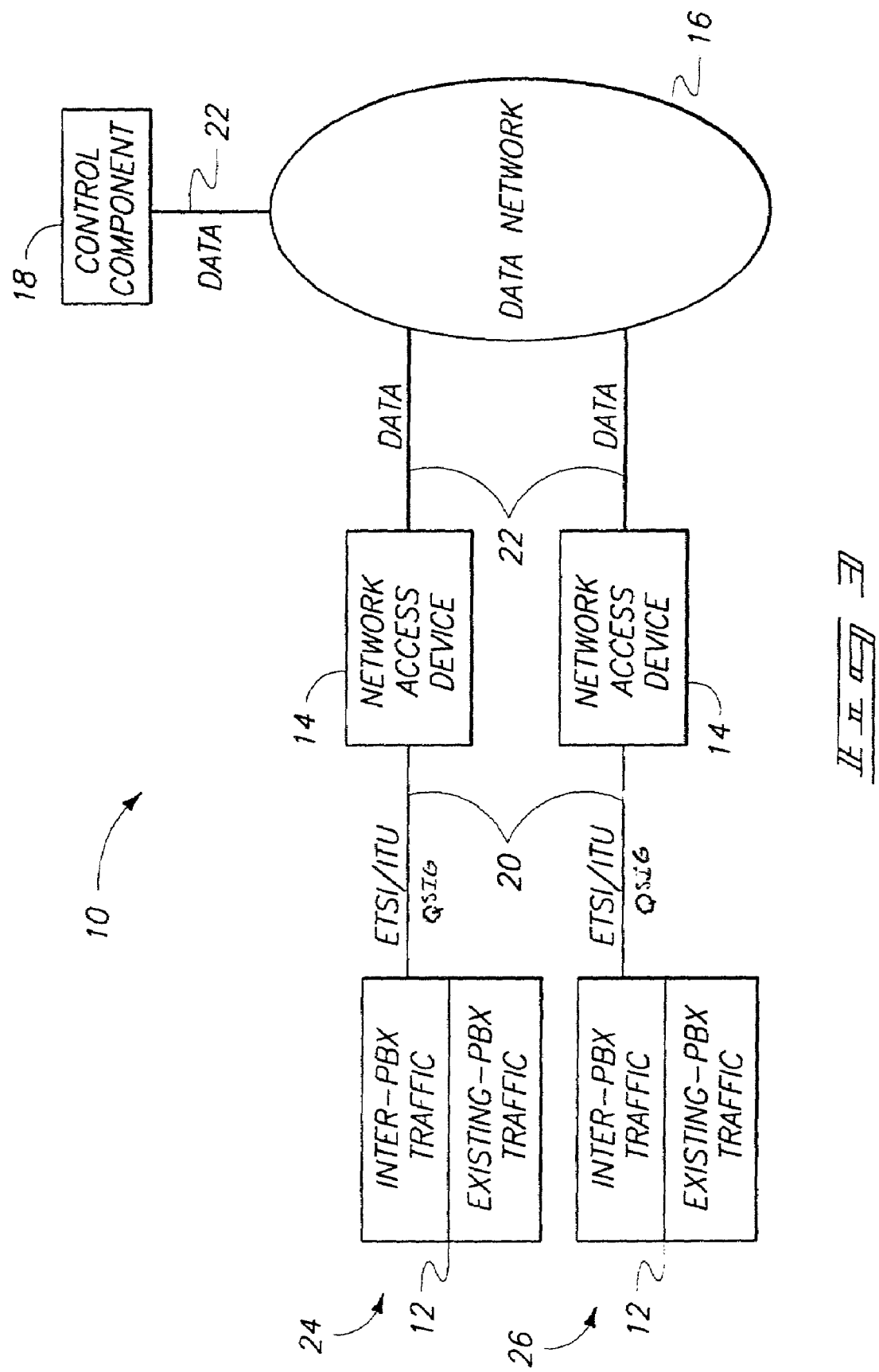
FIG. 3 depicts an illustrative representation of a network topology for non-ETSI/ITU countries.

Referring specifically to FIG. 3, a communication system comprising a network 10 includes plural QSIG devices 12. Devices 12 are arranged to implement communications using QSIG access protocol in the described embodiment. Devices 12 are described herein as PBXs although devices 12 may be individually configured as any device capable of implementing QSIG communications.

As illustrated, PBXs 12 are individually configured to partition communications into inter-PBX communications and existing-PBX communications according to aspects of the invention. Inter-PBX traffic refers to communications of the PBX externally with devices not supported by the PBX while existing-PBX traffic refers to communications between devices supported by the given PBX. PBXs 12 are individually configured to formulate QSIG communications comprising interPBX communications after appropriate partitioning, if partitioning is provided.

PBXs 12 are coupled with respective network access devices 14, a data network 16 and a control component 18. Plural interfaces 20 couple PBXs 12 with respective network access devices 14. Interfaces 20 are implemented as ETSI/ITU QSIG interfaces in the depicted exemplary arrangement for implementing QSIG communications intermediate devices 12 and devices 14.

In addition, plural exemplary portions 24, 26 of network 10 are shown wherein portion 24 is referred to as an originating portion and portion 26 is referred to as a terminating portion.

Control component 18 is implemented as a call agent (CA) in the described exemplary configuration. Network access devices 14 are implemented as gateways (GWs) in the depicted embodiment. Network access devices 14 provide access to data network 16. In the described embodiment, data network 16 is configured to communicate information in a plurality of packets. Data network 16 comprises an ANSI network in the described exemplary embodiment configured to implement ATM, frame relay, or communications according to other protocols. Other configurations of data network 16 are possible.

Network access devices 14 implemented as gateways provide TDM to data conversion operations in the described embodiment. As described further below, encapsulation of signaling information and bearer (e.g., voice) information is provided to enable tunneling of QSIG D channels to control component 18 and presentation of QSIG bearer channels to data network 16 according to aspects of the present invention.

QSIG communications on interfaces 20 include content (e.g., voice) portions and signaling portions corresponding to respective bearer or B channel portions and data or D channel portions of the QSIG communication. Aspects of the invention accommodate continuous QSIG communications including a continuous content portion and a continuous signaling portion which are converted into a plurality of respective content packets and signaling packets using devices 14. As such, devices 14 convert the content portion and signaling portion intermediate respective continuous data stream formats and packet formats. Devices 14 individually communicate content portions of communications using a respective QSIG bearer channel and signaling portions using a QSIG data channel with respect to the respective PBX 12.

Data interfaces 22 provide connectivity of network access devices 14 to data network 16. Data interfaces 22 convey converted D channels and converted bearer channels. Data interfaces 22 of originating portion 24 and terminating portion 26 may be referred to as an originating location and terminating location, respectively, with respect to data network 16. In addition, devices 12, 14 of portions 24, 26 may be referred to as originating devices and terminating devices, respectively.

Data network 16 is utilized to route converted D channels between network access devices 14 and the control component 18 as well as bearer channels between appropriate network access devices 14. Although only two network access devices 14 are depicted coupled with data network 16, it is to be understood that additional network access devices are provided in typical configurations.

Control component 18 is utilized to process and control inter-PBX traffic based upon tunneled QSIG D channel information received from an originating device 14. According to aspects of the present invention, the control component 18 uses a transit PINX control model.

As shown in FIG. 3, originating portion 24 and terminating portion 26 are utilized for discussion purposes. At other moments in time, portion 26 may be an originating portion and portion 24 may be a terminating portion. The devices 12 coupled with portions 24, 26 communicate with one another in the depicted embodiment. At other moments in time, one or more of the devices 12 may communicate with other devices, such as other PBXs, coupled with data network 16 and not illustrated in the exemplary depicted arrangement.

Referring to FIG. 4, exemplary originating operations are depicted with respect to network 10. Originating PBX 12 depicted in FIG. 4 includes a plurality of components including originating call control (OCC), originating protocol control (OPC), and a originating signaling carriage mechanism (OSCM). Network access device 14 configured as a gateway includes plural signal carriage mechanism portions and control component 18 includes a transmit call control (TrCC), incoming protocol control (IPC) and incoming signaling carriage mechanism (ISCM).

The originating call control within originating PBX 12 formulates a call request message which is sent to the originating protocol control. The originating protocol control sends the information to the originating signaling carriage mechanism for transport over interface 20 configured as a time division multiplex (TDM) data link implementing QSIG access protocol in the described arrangement. While exemplary embodiments of the present invention show utilization of a TDM data link, one of ordinary skill would appreciate that other types of generic data links (e.g., digital data links) could also be employed within the communications system of the present invention. The TDM data link implemented by interface 20 terminates at network access device 14.

Network access device 14 repackages the received OCC and OPC data into data streams that can be conveyed by data network 16. According to aspects of the present invention, network access device 14 encapsulates the OCC and OPC data for tunneling to control component 18. Network access device 14 sends the repackaged data to data network 16 for transport to the control component 18.

The repackaged data communicated from network access device 14 is received within incoming signaling carriage mechanism of control component 18. The incoming signaling carriage mechanism sends the received data to the incoming protocol control of control component 18. The incoming protocol control forwards the data to transit call control for further processing including analyzing the address information within the data, performing necessary operations to establish a bearer channel through data network 16, and preparing the message for transmission to the subsequent terminating PBX or other destination using data network 16.

Referring to FIG. 5, exemplary basic call termination operations of network 10 include the following procedure according to exemplary aspects of the present invention. The terminating PBX 12 includes a terminating call control (TCC), a terminating protocol control (TPC), and a terminating signaling mechanism (TSCM). Control component 18 includes a transit call control (TrCC), an outgoing protocol control (OtPC) and an outgoing signaling carriage mechanism (OtSCM).

The transit call control of the control component 18 reformulates a received call request message and sends the request to the outgoing protocol control. The outgoing protocol control sends the request to the outgoing signaling carriage mechanism for transport over the interface 22. The outgoing signaling carriage mechanism packages the received transit call control and outgoing protocol control data into data streams that can be conveyed by data network 16 and sends the packaged data to data network 16 for transport to the terminating network access device 14.

Network access device 14 repackages the received data network information into TDM datalink information and sends the information to the terminating PBX depicted in FIG. 5. The terminating PBX receives the data communicated from the control component 18 within the terminating signaling carriage mechanism. The terminating signaling carriage mechanism sends the message to the terminating protocol control for processing. The terminating protocol control sends the message to the terminating call control for further processing. The terminating call control analyzes the address information within the message and performs necessary operations to establish a bearer channel from the terminating PBX 12 to the terminating network access device 14 and prepares messages for transmission to the originating PBX 12.

Messaging between the originating PBX 12 and the terminating PBX 12 uses the same paths as described above and conformed to ETSI/ITU standards for QSIG capability in the described exemplary embodiment. The control component 18 performs signaling functions for a transmit PINX in the described exemplary embodiment.

Referring to FIG. 6, organization of bearer channel to bearer channel communications according to aspects of the present invention is described. The originating PBX 12 within originating portion 24 of network 10 places a message addressed to control component 18. Network access device 14 is configured to provide the message to establish a call to terminating PBX 12 within terminating portion 26 using a tunneled D channel implemented as a virtual circuit 30 in the described exemplary embodiment. Virtual circuit 30 may be implemented as a switched virtual circuit or permanent virtual circuit in exemplary embodiments.

Control component 18, responsive to receiving the request from the originating PBX 12, formulates a message to establish communications with the terminating PBX 12 via another tunneled D channel virtual circuit 32 which may be implemented as a switched virtual circuit or permanent virtual circuit in the described exemplary embodiment. While switched virtual circuits and permanent virtual circuits are described as exemplary circuits used within the present invention, it should be understood that other types of circuits can be utilized when employing other types of protocols in accordance with exemplary embodiments of the present invention discussed herein. Control component 18 operates to communicate the signaling portion to the terminating portion 26 using data network 16.

The communication of the message from control component 18 via virtual circuit 32 establishes a bearer channel connection 34 intermediate network access devices 14 of the originating and terminating portions 24, 26 to accommodate bearer communications therebetween. In the described exemplary embodiment, control component 18 utilizes virtual circuits configured to communicate tunneled D channel signaling information with respect to individual network access devices 14 coupled with data network 16.

As described herein, a point-to-point communications path is established intermediate the originating and terminating PBXs 12. According to the exemplary embodiment, the control component 18 determines the need for an audio path from the network access device 14 of the originating portion 24 to the network access device 14 associated with the terminating portion 26. The control component 18 selects a bearer channel within both network access devices 14 and performs bearer channel negotiation with the originating and terminating PBXs using the network access devices 14.

Further, the control component establishes a data session between the two network access devices 14 using virtual circuits including a permanent virtual circuit or a switched virtual circuit according to aspects of the present invention. Individual network access devices 14 perform necessary TDM to data and data to TDM conversions corresponding to the communication protocol of data network 16 including ATM, frame relay, etc. Echo control may be provided by a PBX CPE or the network access devices 14. Upon control component 18 detecting the end of a call, the control component 18 returns the bearer channels and their associated data sessions to an idle in-service state.

Utilizing the structure and\or methodologies described herein, a point-to-multipoint session may be established using the described exemplary components, network organization and signaling methods. In the described exemplary arrangement, the PBX and network access device TDM interfaces conform to ETSI/ITU specifications for QSIG interfaces wherein inter-PBX traffic uses these TDM facilities. Other traffic types may also use the facilities if such conforms to the interface specifications being utilized. Further, the TDM interfaces devices may be configured to communicate according to other specifications in other embodiments.

Data network 16 receives a QSIG communication including a content portion and signaling portion encapsulated into a plurality of respective packets by network access device 14 of the originating portion 24 for communication within data network 16. Data network 16 communicates the signaling portion to control component 18 using circuit 30 in the described embodiment. Using circuit 32, control component 18 establishes connection 34 between the originating location of portion 24 with the termination location of portion 26 responsive to receiving the signaling portion. In the described embodiment, control component 18 configures originating and terminating devices 14 to establish connection 34 responsive to the signaling portion of the QSIG communication. Data network 16 implements communication of the content portion within a plurality of packets intermediate the originating location and terminating location using connection 34.

Referring to FIGS. 7-10, exemplary inter-working methods and structure are described with reference to a network 10a. Functionality described herein with respect to network 10a may also be implemented within the previously described network 10 if appropriate devices (e.g., switch 40 described below) are coupled with data network 16 of network 10.

According to aspects of the present invention, the communication systems and methodologies described herein are configured to inter-work with EC based or other QSIG deployments for full feature transparency. Some inter-working arrangements utilize concepts and techniques described above with respect to network 10. Additional concepts are discussed below with respect to network 10a. The depicted network 10a comprises a switch 40 configured to communicate according to different specifications, protocols or standards than data network 16.

For example, in exemplary configurations where data network 16 is configured according to an ANSI standard, switch 40 may be implemented as a tandem switch compatible for ETSI/ITU communications. Switch 40 is utilized to route inter-PBX calls that terminate to or originate from EC countries in the described exemplary embodiment and wherein data network 16 is configured according to the ANSI standard. Network 16 may be configured according to other specifications or standards in other embodiments.

Referring to FIG. 8, exemplary originating operations for inter-working signaling methods within originating portion 24 are described. Originating call control within the originating PBX 12 formulates a call request message and sends the request to the originating protocol control. The originating protocol control sends the message and the request to the originating signaling carriage mechanism for transport over the TDM datalink interface 20 terminating within network access device 14. Network access device 14 repackages the received OCC and OPC data into data streams that can be conveyed to data network 16. Network access device 14 sends the repackaged data to data network 16 for transport to control component 18.

Control component 18 receives communicated data within an incoming signaling carriage mechanism which sends the message to the incoming protocol control for processing. The incoming protocol control forwards the message to transit call control for further processing including analyzing the address information within the message, performing necessary operations to establish an appropriate bearer channel through data network 16 and to map contents of the message (e.g., comprising an ETSI/ITU ISDN or QSIG message according to the aspects of the present invention) to an another appropriate message (e.g., ETSI/ITU ISUP message) for subsequent communication using switch 40. Accordingly, control component 18 implements conversion of the message to a different message standard compatible with another network (not shown) coupled with switch 40. In the described embodiment, control component 18 operates to map signaling portions from a QSIG access protocol to another different signaling standard. In the described exemplary embodiment, switch 40 may be referred to as a non-QSIG device.

FIG. 9 depicts exemplary inter-working signaling methods within terminating portion 26. Basic call termination according to aspects of the present invention includes control component 18 forwarding the ISUP message to switch 40 following mapping of the ETSI/ITU ISDN or QSIG message to the appropriate ETSI/ITU ISUP message using component 18. An exemplary switch 40 comprises a transit switch, also referred to as an international tandem switch. The ISUP message may be sent to the destination switch via an A link 41 to a signal transfer point 42 and another A link 43 to switch 40. According to other aspects, the ISUP message is sent to switch 40 via an F link through data network 16 to terminating network access device 14 where data to TDM conversion is performed and communicated subsequently to switch 40. Switch 40 performs standard ITSI/ITU ISUP call processing related to these types of calls.

FIG. 10 depicts further details regarding the exemplary inter-working bearer channel method. FIG. 10 depicts organization of a bearer channel to E1 channel inter-working method. The architecture depicted in FIG. 10 provides a point-to-point communications path. Initially and based upon the QSIG protocol, control component 18 determines the need for an audio path from the network access device 14 associated with the originating PBX 12 to the network access device 14 associated with switch 40.

Control component 18 selects a bearer channel within both network access devices 14 and performs bearer channel negotiation with the originating PBX 12 and E1 trunk selection T switch via the respective network access devices 14. The control component 18 establishes a data session between the two network access devices 14.

The network access devices 14 perform TDM to data and data to TDM conversions. Echo control may be provided by the PBX CPE, switch 40 or network access devices 14. Upon control component 18 detecting an end of call, the control component 18 returns via ISDN or ISUP signaling the bearer channel, E1 Channel and associated data sessions to idle in-service states.

Point-to-multipoint sessions may also be established using network 10a and methodologies of the present invention. Further, the PBX and network access device 14 TDM interface 20 conforms to ETSI/ITU specifications for QSIG interfaces for communication of inter-PBX traffic in the described exemplary embodiment. Other traffic types may use the facilities if conforming to the interface specifications. Interface 20 may be configured according to other specifications in other embodiments.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A method comprising:
    partitioning inter-Private Branch Exchange (PBX) communications from existing PBX communications, where an inter-PBX communication is received from a device not supported by a PBX;
    receiving a partitioned inter-PBX communication, via a first network access device, the partitioned inter-PBX communication comprising a content portion and a signaling portion in accordance with a QSIG access protocol;
    encapsulating the content portion and the signaling portion of the partitioned inter-PBX communication, via the first network access device, to provide a plurality of respective content packets and signaling packets;
    transmitting the signaling packets from the first network access device to a control component via a data network;
    establishing, via the control component, a connection within the data network between the first network access device and a second network access device in response to receiving the signaling packets; and
    communicating the content packets from the first network access device to the second network access device over the established connection.

2. The method of claim 1 where the establishing comprises configuring the first network access device and the second network access device using the control component to establish the connection via the data network.

3. The method of claim 1 further comprising mapping the signaling portion from a QSIG access protocol to another signaling protocol, and communicating the signaling portion to the second access device after the mapping.

4. A method comprising:
    partitioning inter-Private Branch Exchange (PBX) communications from existing PBX communications, where an inter-PBX communication is received from a device not supported by a PBX;
    receiving a partitioned inter-PBX communication, the partitioned inter-PBX communication comprising a QSIG content portion and a QSIG signaling portion;
    encapsulating the QSIG content portion and the QSIG signaling portion of the partitioned inter-PBX communication, by a first network access device, to provide a plurality of respective content packets and signaling packets;
    sending the signaling packets from the first network access device to a control component through a first D channel via a data network;
    establishing, via a second D channel from the control component to a second network access device, a B channel connection within the data network between the first network access device and the second network access device; and
    communicating the content packets from the first network access device to the second network access device over the established B channel connection.

5. The method of claim 4 where the first and second D channels are implemented as virtual circuits.

6. The method of claim 4 where the B channel is implemented as a virtual circuit.

7. The method of claim 4 where the received partitioned inter-PBX communication is transmitted from a first PBX switch.

8. The method of claim 7 where the second network access device transmits the content packets to a second PBX switch.

9. The method of claim 4 where the QSIG content portion and a QSIG signaling portion are continuous signals.

* * * * *